(12) United States Patent
Jenkins

(10) Patent No.: US 6,371,501 B2
(45) Date of Patent: Apr. 16, 2002

(54) TREAD WHEEL FRAME SYSTEM

(76) Inventor: Stephen S. Jenkins, 2716 Maple St., Fenwick, Ontario (CA), L0S 1C0

(*) Notice: Subject to any disclaimer, the term of this patent is extended or adjusted under 35 U.S.C. 154(b) by 0 days.

(21) Appl. No.: 09/798,090

(22) Filed: Mar. 5, 2001

Related U.S. Application Data

(63) Continuation-in-part of application No. 09/225,090, filed on Jan. 4, 1999, now abandoned.

(51) Int. Cl.[7] ............................................. B62M 27/00
(52) U.S. Cl. ...................... 280/216; 280/215; 280/274; 280/276; 280/293; 180/165; 180/207
(58) Field of Search ................................ 180/165, 207, 180/221; 280/253, 255, 259, 215, 216, 274, 276, 281.1, 293, 304, 299

(56) References Cited

U.S. PATENT DOCUMENTS

| | | | | |
|---|---|---|---|---|
| 590,492 A | * | 9/1897 | Calderwood et al. | 280/216 |
| 607,795 A | * | 7/1898 | Gallaway | 280/299 |
| 1,410,326 A | * | 3/1922 | Labak | 280/216 |
| 1,650,450 A | * | 11/1927 | Jochum | 280/216 |
| 2,177,381 A | * | 10/1939 | Bichi | 280/216 |
| 4,178,807 A | * | 12/1979 | Young | 280/255 |
| 5,431,426 A | * | 7/1995 | Ijams et al. | 280/275 |
| 5,778,998 A | * | 7/1998 | Shih | 180/221 |
| 6,129,646 A | * | 10/2000 | Farmos | 280/241 |
| 6,315,313 B1 | * | 11/2001 | Huang | 280/216 |

FOREIGN PATENT DOCUMENTS

CH          7771     * 12/1893

* cited by examiner

*Primary Examiner*—Daniel G. DePumpo

(57) ABSTRACT

A Tread Wheel Frame System drives a human-powered cycle by a tread wheel driving a tread of a drive wheel of a cycle rather than driving a drive wheel hub, as conventional cycles do. Most of the driving mechanism, including the tread wheel, a speed ratio mechanism, shifting device, and a power unit device, are safely located above the level of a cycle's axles where they are less likely to encounter accidental impact. The tread wheel with the power unit device also does the braking, which eliminates the need for caliper brakes or hub brakes. Accordingly, a drive wheel is lighter, without the need for a heavy hub, or a heavy rim to withstand the wear and heat of friction of caliper brakes. The tread wheel frame is uniquely designed and engineered to be light, yet strong where needed. The best mode includes many features: an energy recapture and storage system that saves energy that would be lost in braking, for assisting in going up hills, thigh levers, extendable pedal cranks for providing more pedal leverage, a frame extension that has no cross bar, and foot room to allow easy, low-level, mounting and dismounting, retractable stand, lean-on device, adjustable steering, and low-mass suspension.

11 Claims, 11 Drawing Sheets

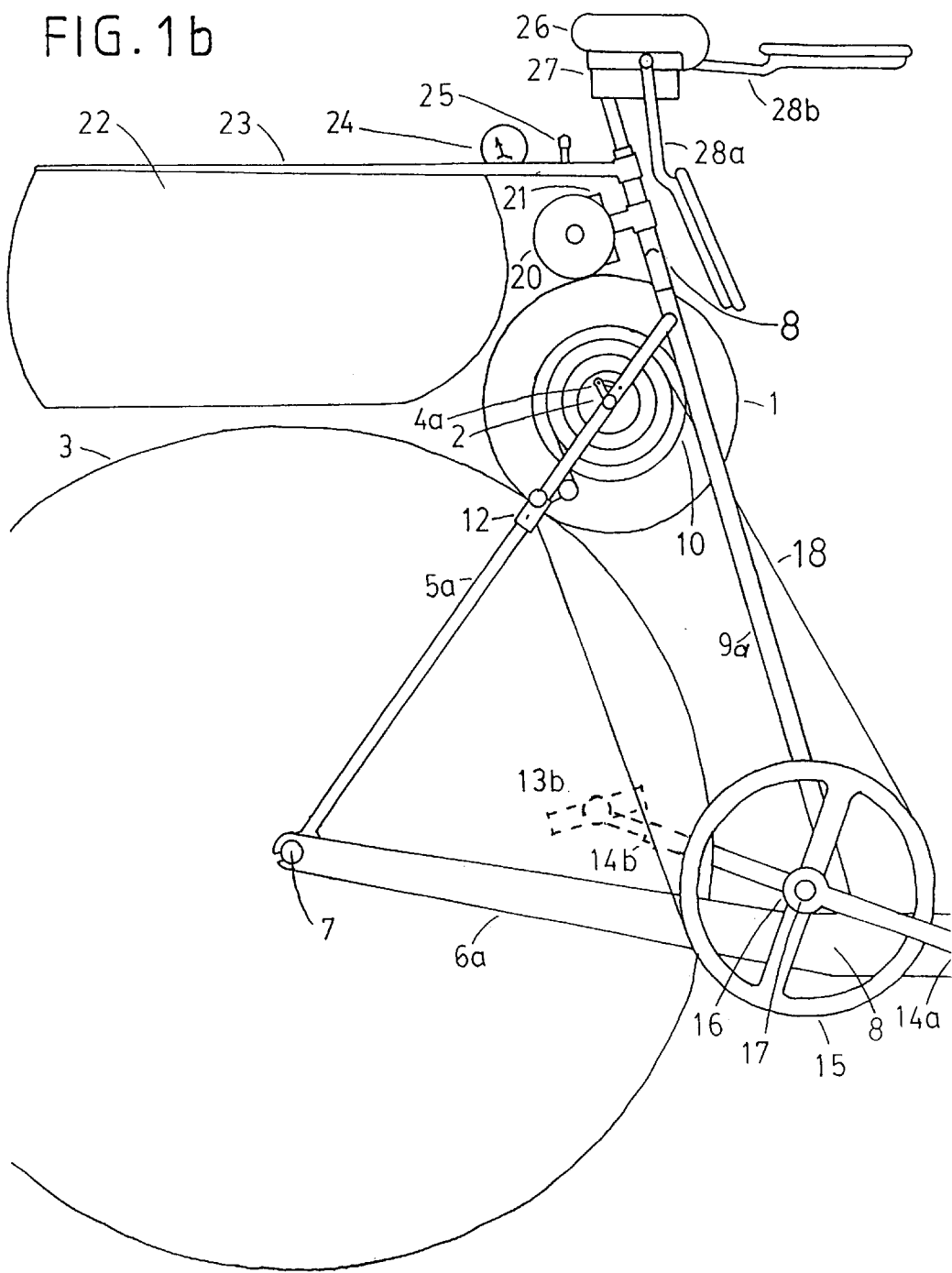

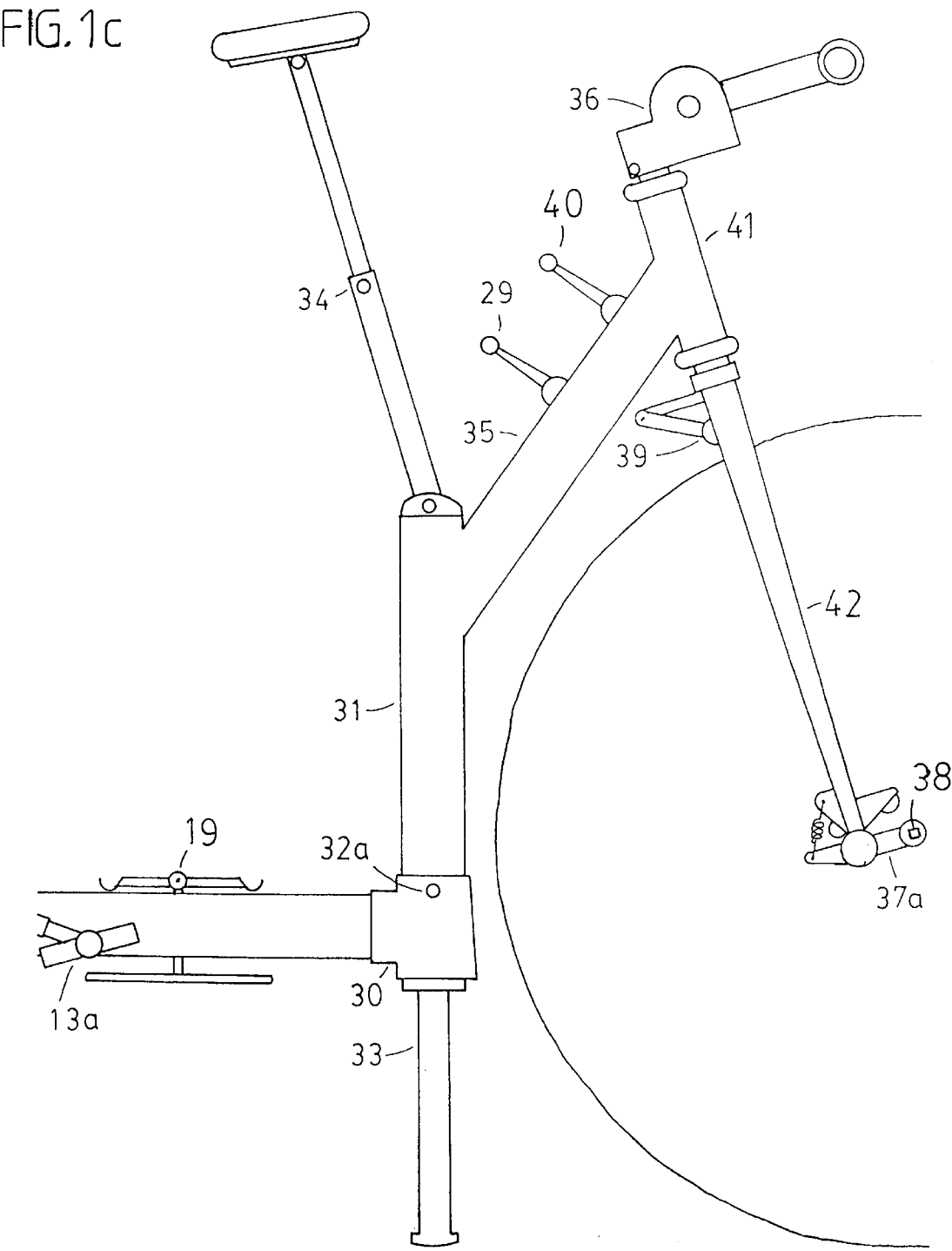

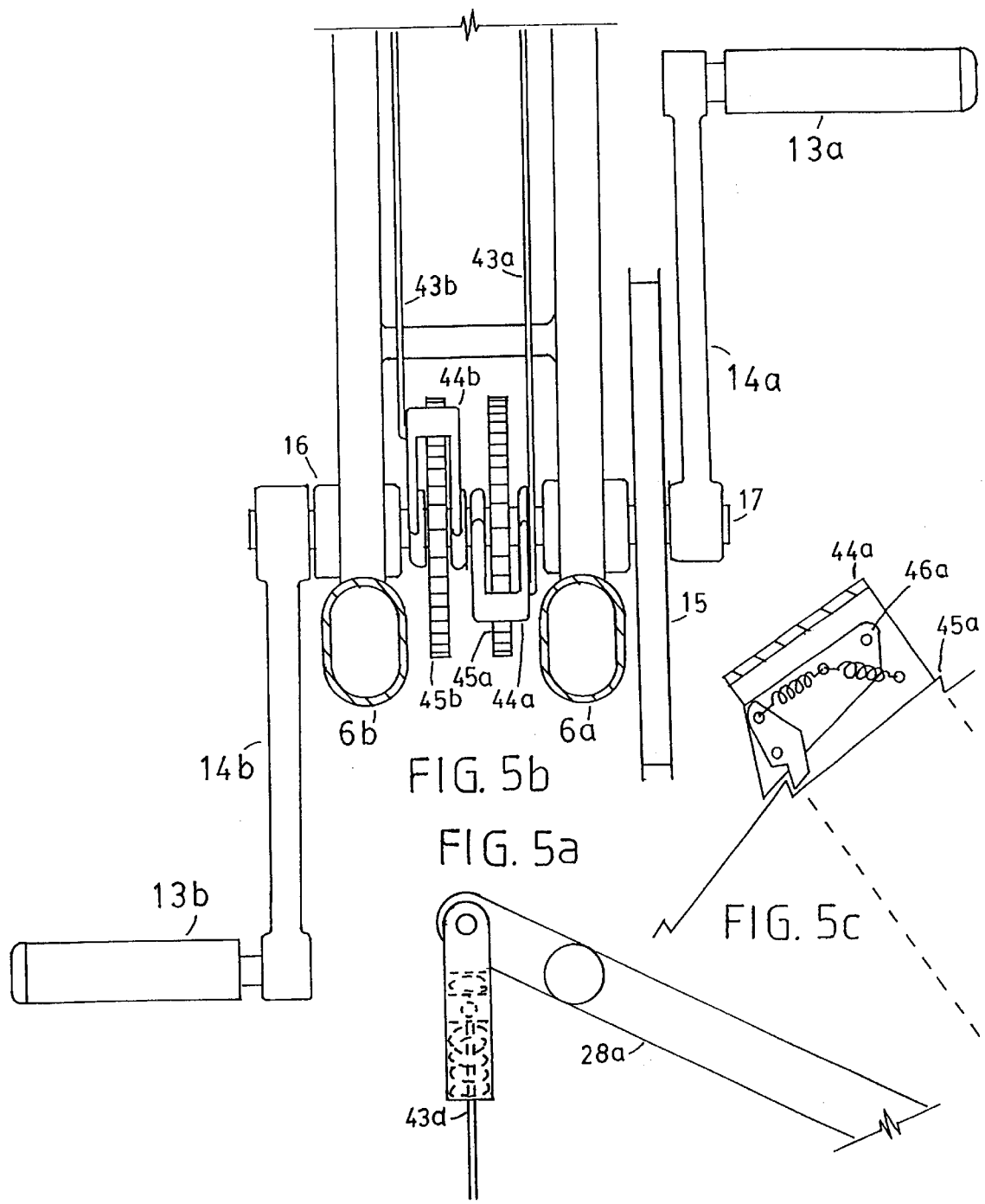

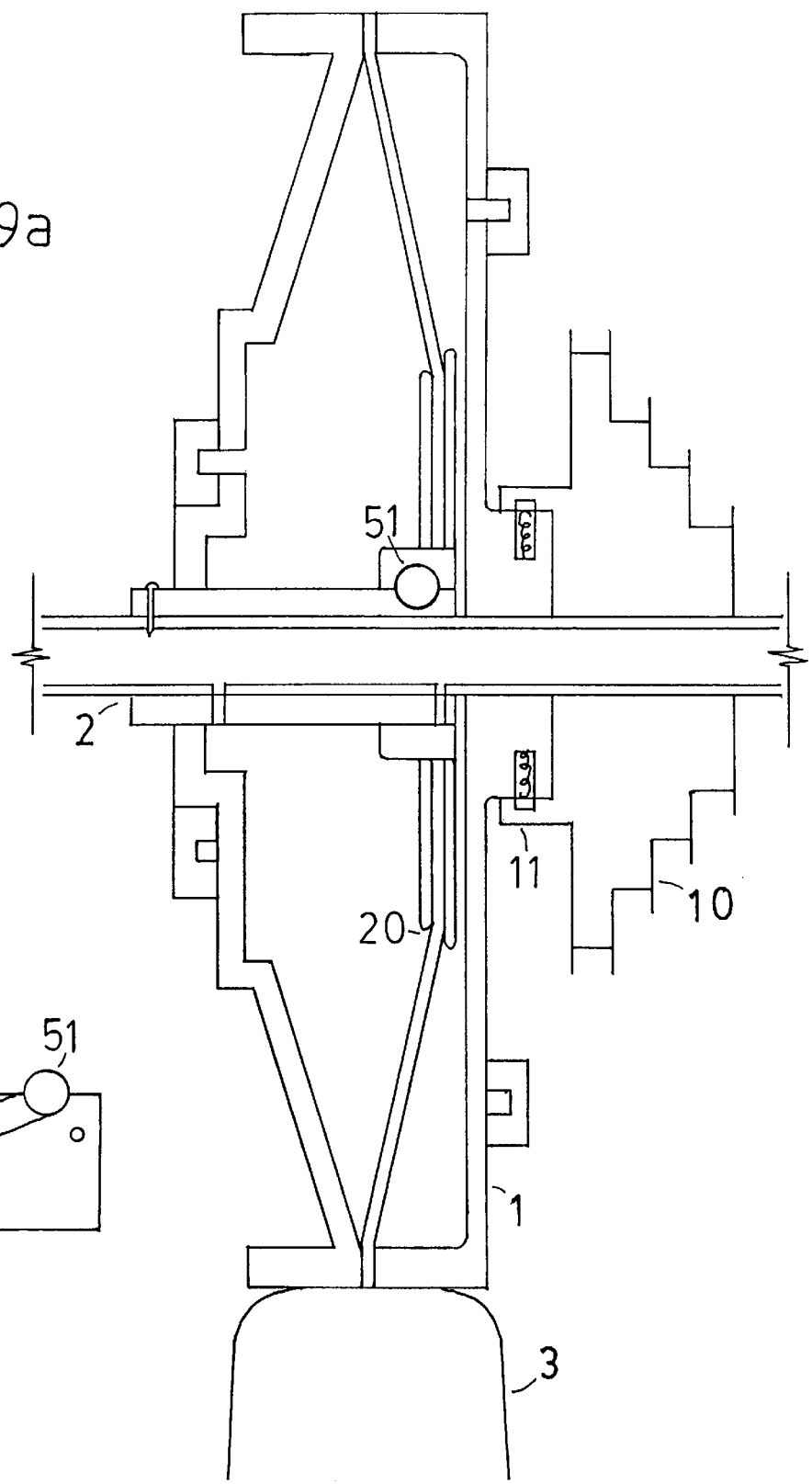
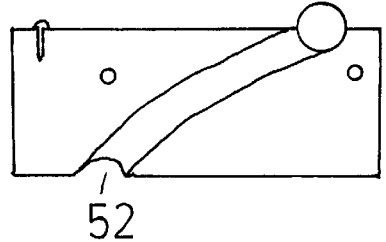
FIG. 9a
FIG. 9b

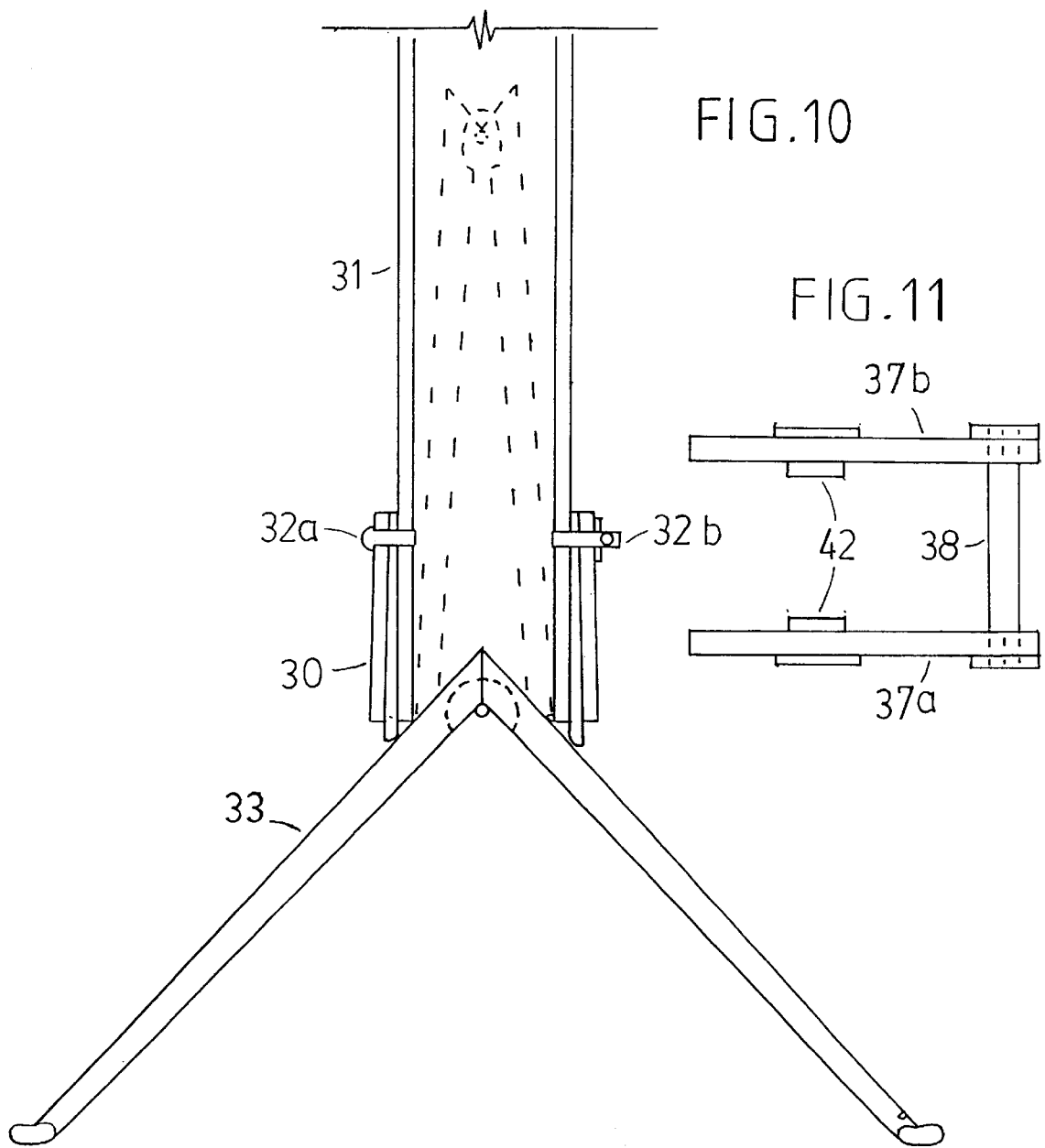

TREAD WHEEL FRAME SYSTEM

SPECIFIC REFERENCE TO EARLIER FILED APPLICATION

This is a Continuation-In-Part of application Ser. No. 09/225,090 filed Jan. 4, 1999 now abandoned entitled "Tread Wheel Frame System", filed in the United States by the same inventor, Stephen S. Jenkins, and has the same effect and scope as the prior application, subject to amendments and additions herein.

FIELD OF THE INVENTION

This invention relates to human-powered cycles

BACKGROUND OF THE INVENTION

Early vehicles called velocipedes had no brakes or drive mechanism. Later, single speed bicycles featured a "coaster brake" in a rear wheel hub, and a drive mechanism. In Britain, where hills were common, a transmission occupied the rear wheel hub, so braking was moved to wheel rims. For hills a drive mechanism evolved to a multiple speed "derailleur" mounted a few inches off the ground, victim to water, mud, weeds, rocks, and other debris. One improvement of the present invention is that the drive mechanism is mounted safely above the level of axles. Other improvements provide solutions to problems of squealing, chattering, abrading, dragging, uneven, awkward caliper brakes, uncomfortable tissue-damaging saddles, hard ride, waste of operator's energy output, vehicle falling over, jarring ride, and the intimidating awkwardness of swinging one's leg over a crossbar, and the tyranny of being trapped astride.

SUMMARY

The feather-soft-ride Tread Wheel Frame System solves many of the drawbacks of cycling that inhibit people from enjoying the remarkable thrill of cycling along quietly under their own power. The high location of the drive mechanism reduces concerns and repairs. The saddle has no horn to damage vital tissues and adjacent thigh levers recover energy and relieve some stress on knees. The stand parks the frame upright. Back stress is reduced by an adjustable lean-on device and by adjustable steering. The absence of a crossbar provides for easy mounting and anxious-free riding which will attract more potential riders. An energy recapture system saves energy normally wasted, such as braking and shock absorbing, and stores this energy in weightless form until it is efficiently used to assist pedaling up hills.

BRIEF DESCRIPTION OF THE DRAWINGS

FIG. 1a and FIG. 1c are respectively LH and RH half views of FIG. 1a.

FIG. 3 is a rear elevation view of a "derailleur" type shift mechanism, and of controlling fittings supporting respective ends of an axle, with a pulley cluster driving a tread wheel by means of a ratchet as shown in FIG. 9a.

FIG. 5a is a side elevation view of a spring-loaded rod connection.

FIG. 5b is a rear elevation view of two U-shaped rod-driven ratcheting levers, each straddling a ratchet wheel connected to a center portion of a crank axle supported by a hub mounted above two frame members.

FIG 5c is an enlarged side elevation cross-section view of a U-shaped ratcheting lever, engaged with a portion of a ratcheting wheel of FIG. 5b, showing spring-loaded ratchet pawls that back off one notch under adjustable pressure.

FIG. 9a is a rear elevation cross-section view of a power unit device(diaphragm pump mode) built into a tread wheel to save weight and space.

FIG. 9b is a view of a drive of FIG. 9a showing a loop channel for a ball.

FIG. 10 is a front elevation cross-section view of a vertical support container showing a two-legged stand in support mode, and retracted mode in ghost.

FIG. 11 is a plan view of a spline axle connecting spring-loaded adjustable axle levers, to move in unison.

DESCRIPTION

Figure 1A:
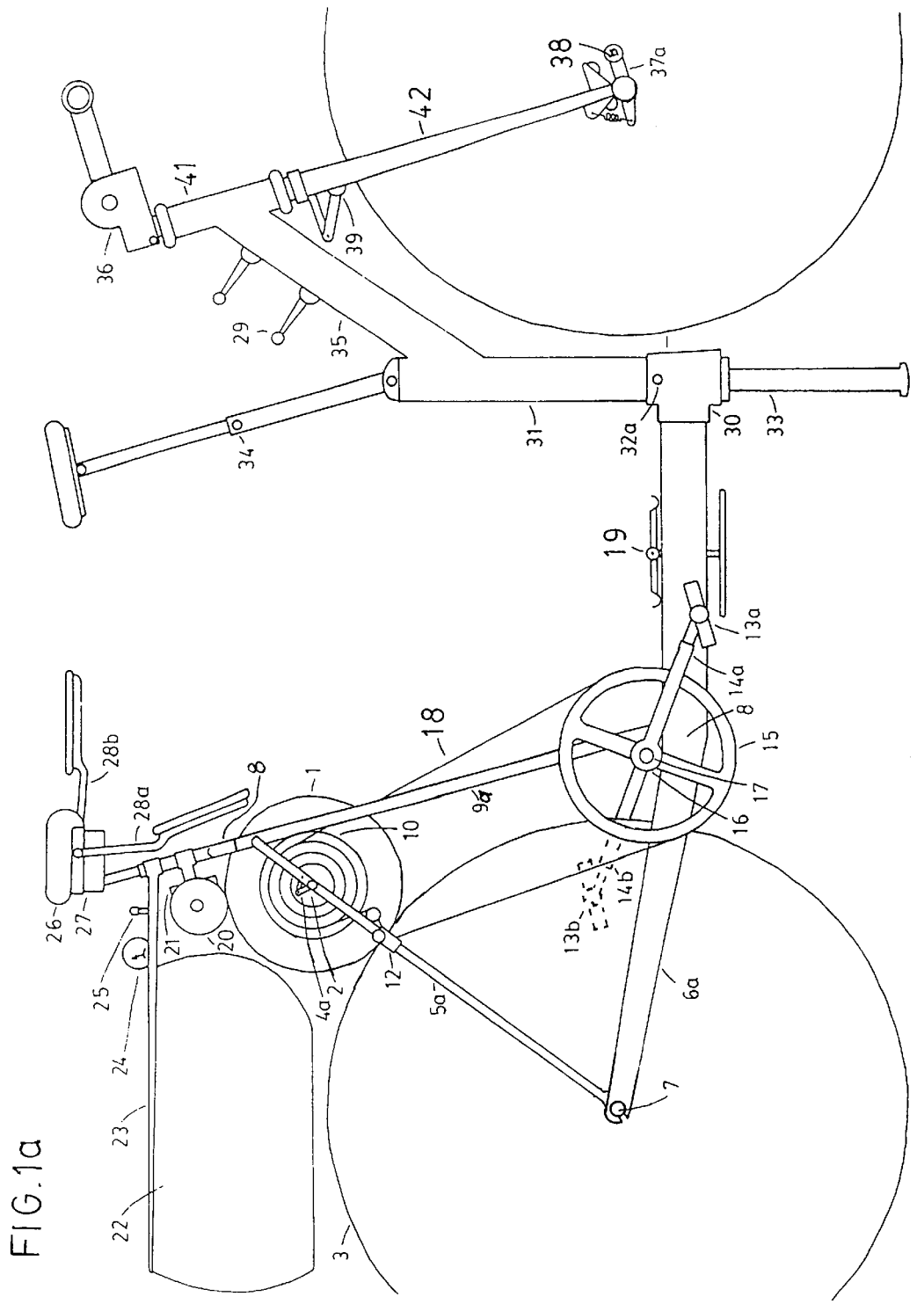
Figure 2:
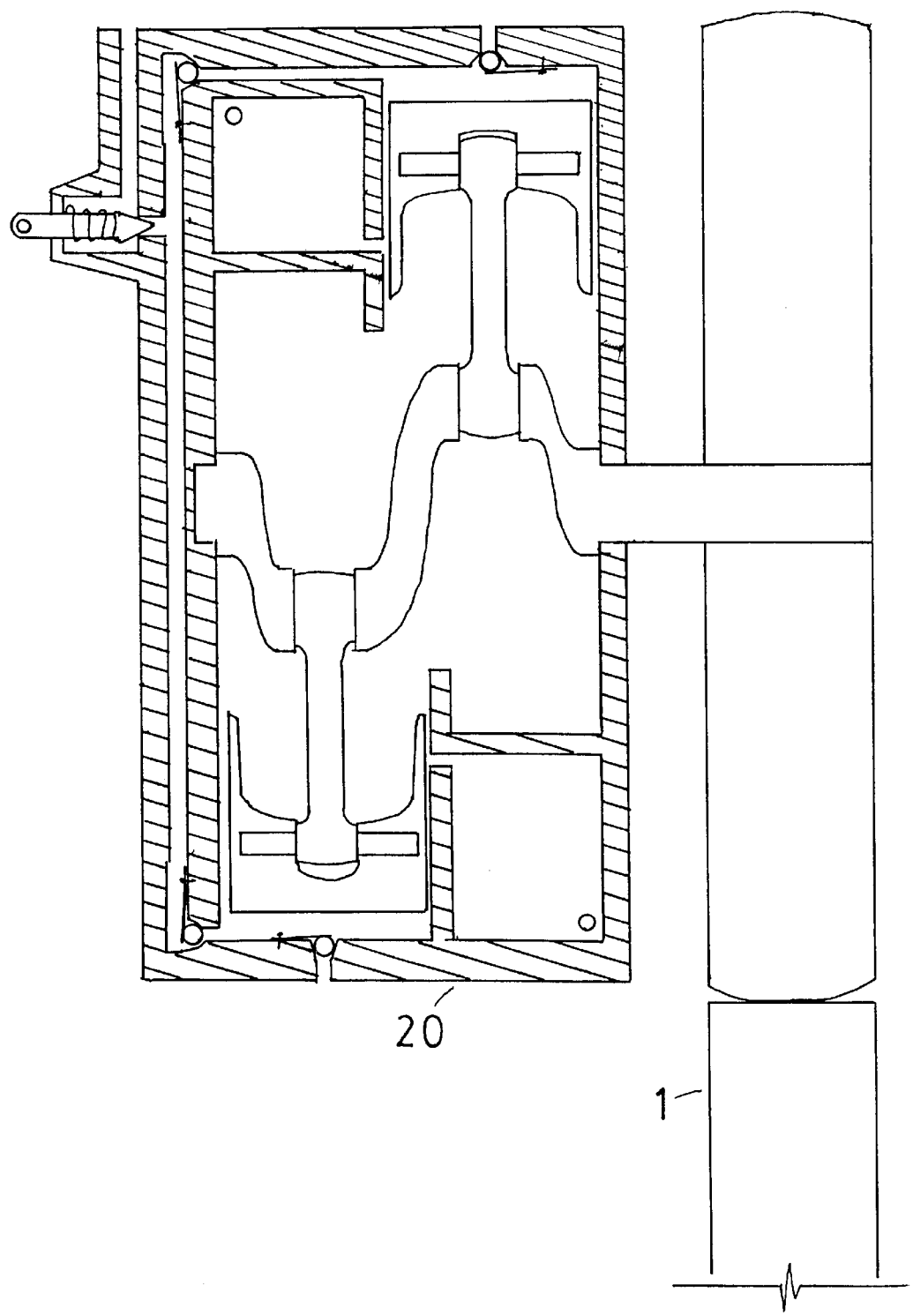
FIG. 2 is a rear elevation cross-section view of a two-cylinder power unit in contact with a tread wheel.
Figure 3:
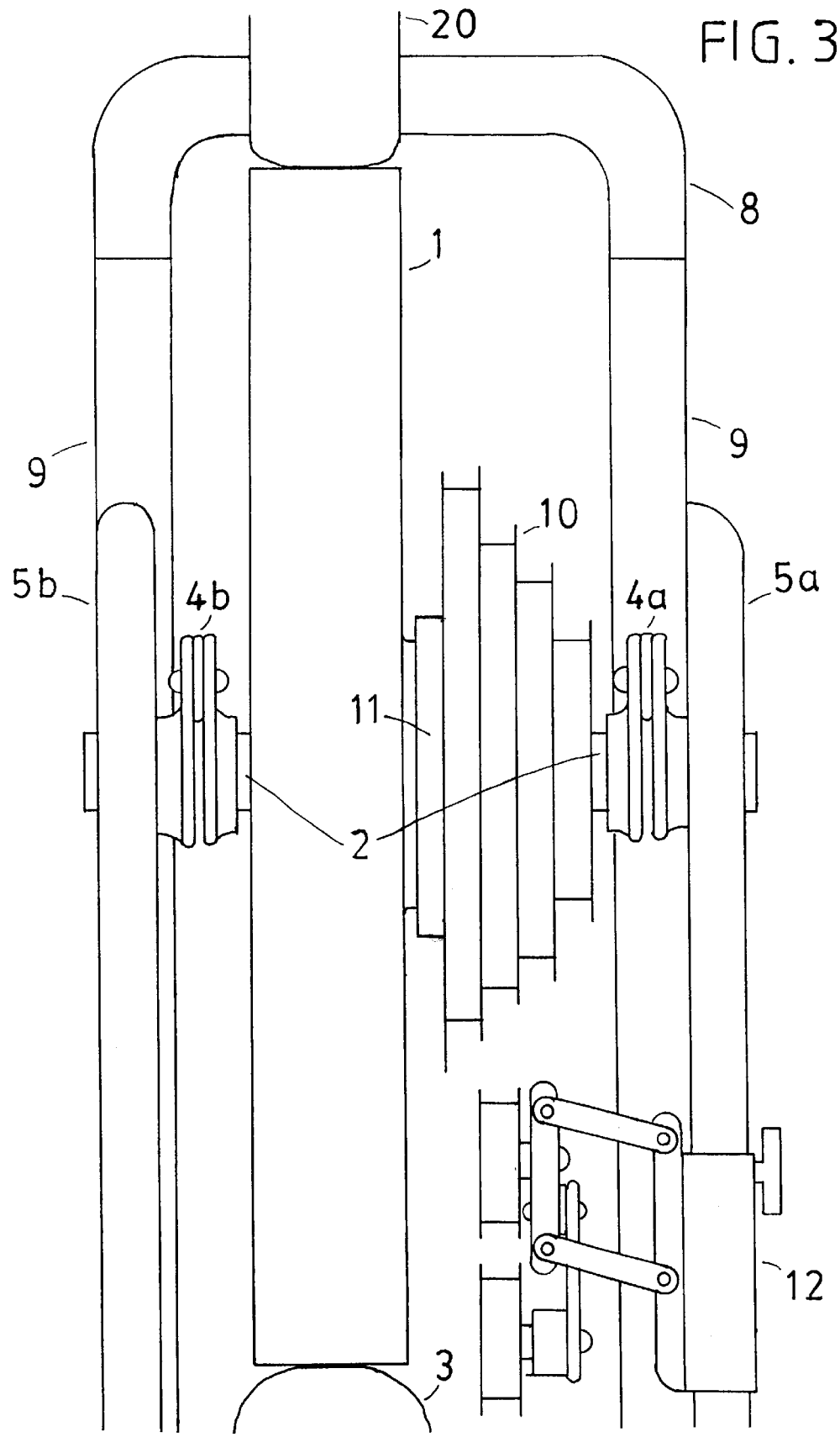

FIG. 1a, FIG. 1b, and FIG. 1c shows the considered best mode where the fundamental Tread Wheel Frame System is enhanced by additional frame configuration, and ancillary structures to add comfort, safety, reliability, efficiency, and energy storage and recovery. Tread Wheel 1 rotates on adjustable axle 2 which controls tread wheel 1 drive of drive wheel 3, which has no rim, by controlling means 4a and 4b, including fittings, which are connected respectively to rear frame members 5a and 5b, upper ends of which are connected respectively to the upper portions of substantially vertical frame members 9a and 9b, whose upper ends are connected to saddle tube 8 which is shaped like an inverted Y. The lower ends of rear frame members 5a and 5b are connected respectively to the rear portions of lower frame members 6a and 6b, whose middle portions are connected to the lower ends of substantially vertical frame members 9a and 9b. Drive wheel axle 7 of drive wheel 3 is detachably connected to the rear portions of lower frame members 6a and 6b, whose middle portions are connected to hub assembly 16, which has bearings supporting the rotation of crank axle 17. Driving means, to utilize the power of a pedaling motion, include pedals 13a and 13b, pedal cranks 14a and 14b, crank axle 17, and drive pulley 15. They drive power transmission means 18, including a drive belt, connecting drive pulley 15 to speed ratio mechanism 10, including a pulley cluster, rotatably mounted on adjustable axle 2. Transmitting means 11, including a ratchet integral with speed ratio mechanism 10 drives tread wheel 1, which drives drive wheel 3, which moves the cycle. Speed ratio mechanism 10, is shifted by shifting means 12, including a derailleur, mounted on the middle portion of rear frame member 5a. FIG. 3 shows symbolic examples of tread wheel 1, adjustable axle 2, controlling means 4a and 4b, speed ratio mechanism 10, and shifting means 12. Cycle braking is accomplished by power unit device 20 connected to saddle tube 8, in contact with tread wheel 1. FIG. 2 shows a symbolic example of a power unit device FIG. 1a, FIG. 1b, and FIG. 1c show the front portions of lower frame members 6a and 6b connected to frame fitting 30, which has retaining pins 32a and 32b for releasably holding substantially vertical support container 31 inside. This permits easy disassembly for putting cycle in automobile trunk. The lower end of sloping frame member 35 is connected to the upper portion of substantially vertical support container 31, and the upper end is connected to steering tube 41. Power lever device 40 to operate power unit device 20, and shift lever device 29 to operate shifting means 12, are connected to the upper portion of sloping frame member 35 for accessible, simple, operation. Adjustable single steering fitting 36 is rotatably connected to steering tube 41.

FIG. 1a, FIG. 1b, and FIG. 1c shows reservoir 22 connected to air tube bracket 23, which is connected to saddle tube 8. Stem valve 25 and air pressure gauge 24 are connected to air tube bracket 23 to introduce and monitor air pressure for reservoir 22.

FIG. 1a, FIG. 1b, and FIG. 1c show power unit device controlling means 21, connected to the middle portion of saddle tube 8, which controls power unit device 20, including controlling air pressure. Shutting off air pressure prevents power unit device 20 from turning which brakes tread wheel 1 and drive wheel 3. Restricting air pressure flow from power unit device 20 while cycling downhill gives gentle braking and pumps air pressure into reservoir 22 for recapture and storing energy. Air pressure stored in reservoir 22 directed to power unit device 20, by power unit device controlling means 21, assists pedaling up hills.

Figure 4A:
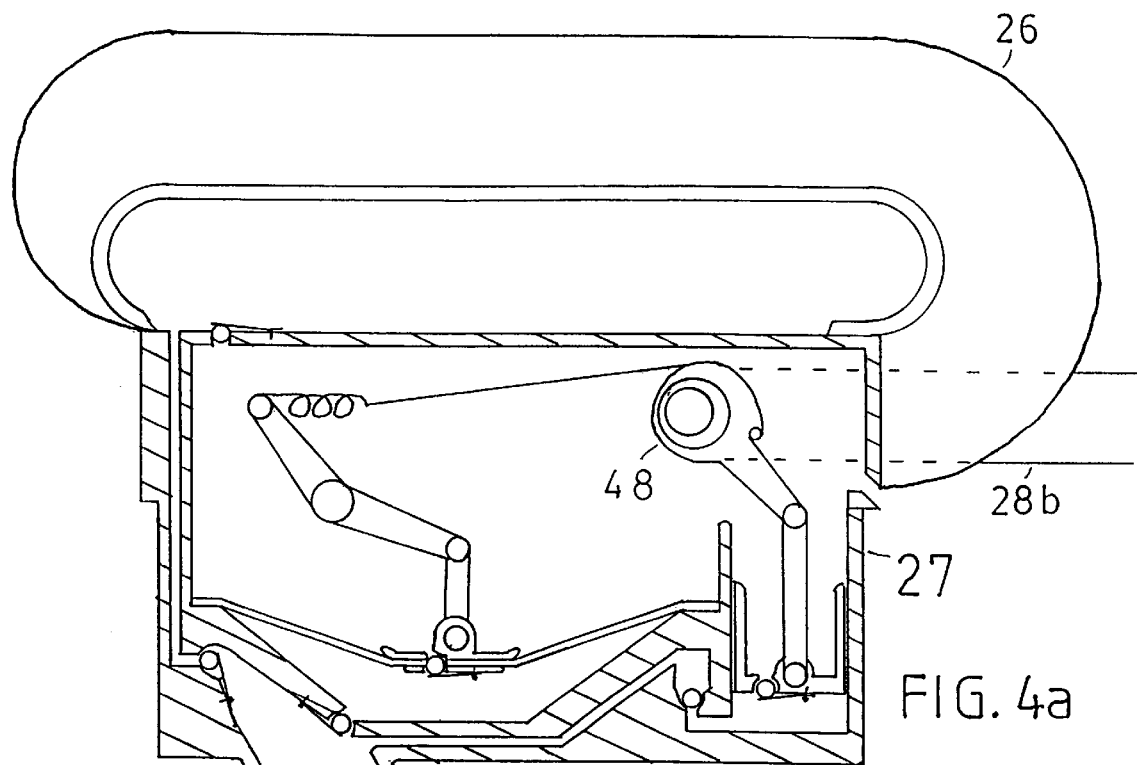
FIG. 4a is a side elevation cross-section view of a pump saddle, and an adjacent thigh lever pump.
Figure 4B:
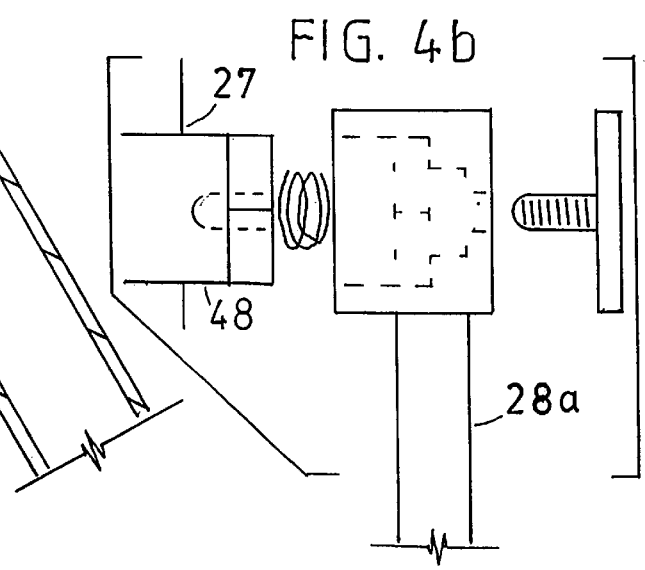
FIG. 4b is a front elevation exploded view of a thigh lever releasably connected to a shaft of a thigh lever pump.

FIG. 1a, FIG. 1b, and FIG. 1c show pump saddle 26 and thigh lever pump 27 detachably connected to the upper portion of saddle tube 8. Thigh levers 28a and 28b, detachably engaged to spring-loaded spline shaft 48 of thigh lever pump 27, are operated by the thigh action of a cycle operator to generate air pressure. A cycle operator moving up and down on pump saddle 26 generates air pressure. FIG. 4a shows a symbolic example of saddle pump 26 and thigh lever pump 27. FIG. 4b shows a symbolic example of thigh lever 28a detached from spring-loaded spline shaft 48. Air pressure generated is stored in reservoir 22.

Figure 8:
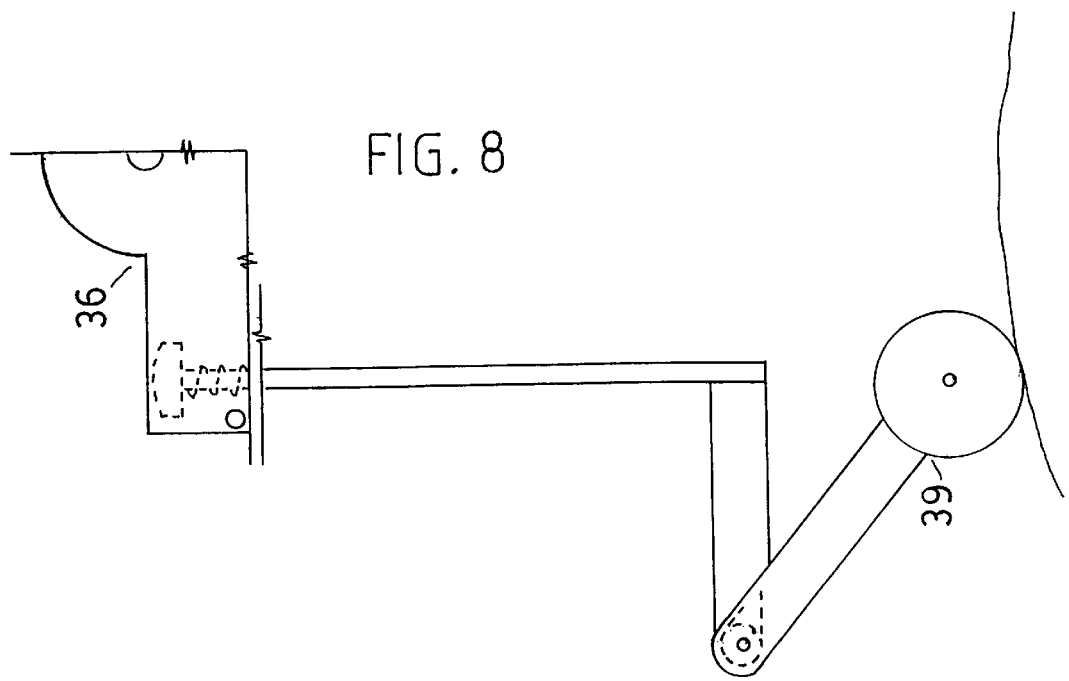
FIG. 8 is a side elevation view of friction wheel brake showing spring-loaded friction wheel actuated through the hollow of a steerer tube.

FIG. 1a, FIG. 1b, and FIG. 1c show retractable stand 33 extended from substantially vertical support container 31 to hold a cycle upright. FIG. 10 also shows it retracted inside, in ghost. An adjustable lean-on device 34 is detachably connected to the upper end of substantially vertical support container 31 which provides comfort. Friction wheel brake 39 operated through steering tube 41 provides gentle braking control that will not lock up and throw a cycle operator forward. FIG. 8 shows the knee-action that keeps friction wheel brake 39 in contact, even with the flexing of spring-loaded adjustable axle levers 37a and 37b.

FIG. 1a, FIG. 1b, and FIG. 1c show steering forks 47 rotatably mounted to steering tube 41 and controlled by adjustable single steering fitting 36. Spring-loaded adjustable axle levers 37a and 37b are pivotably mounted to distal ends of steering forks 47 to provide a cushioned ride. FIG. 11 shows spline axle 38 locking spring-loaded adjustable axle levers 37a and 37b in travel unison.

Figure 6A:
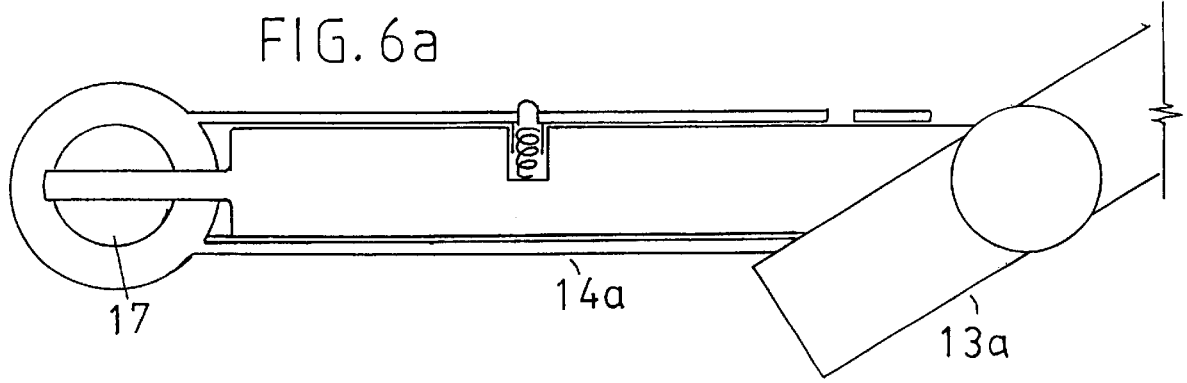
FIG. 6a is a side elevation cross-section view of a pin formed on end of inner shaft of extendable pedal crank passing through a crank axle.
Figure 6B:
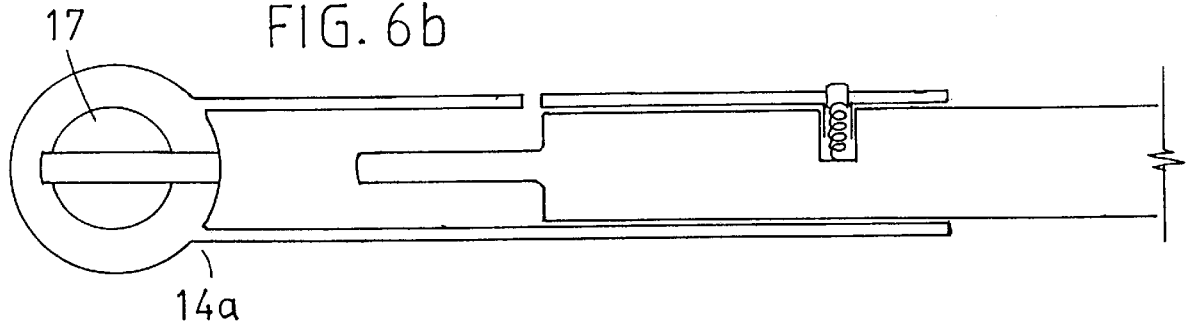
FIG. 6b shows FIG 6a where pin is released from crank axle, thereby allowing a ratcheting action by the pedal cranks, which action rotates the crank axle
Figure 6C:
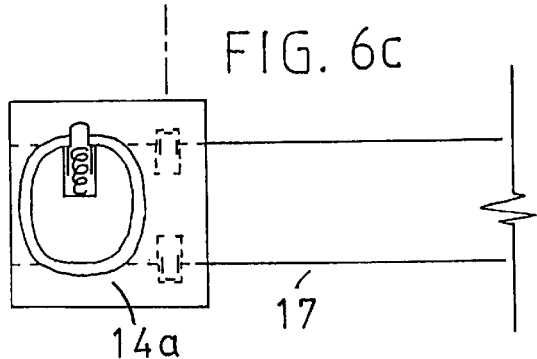
FIG. 6c is a front elevation cross-section view of ratchet of FIG. 6a and FIG. 6b.
Figure 6D:
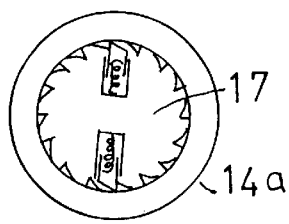
FIG. 6d is an inner elevation cross-section view of ratchet of FIG. 6c.
Figure 7:
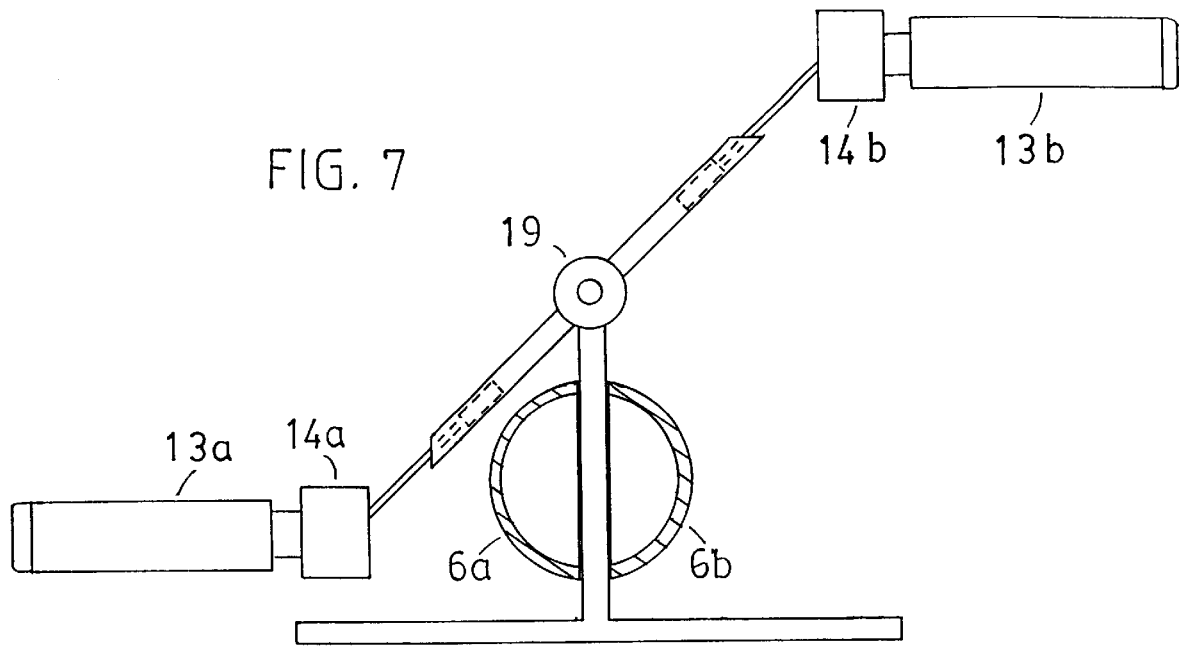
FIG. 7 is a front elevation view of extendable swivel, controlling motion of extended pedal cranks so that as one arcs downward the other is lifted upward, and of a limiting device swung into position, to limit pedal crank from striking ground.

FIG. 1a, FIG. 1b, and FIG. 1c show pedal cranks 14a and 14b that quickly and easily telescope and extend to provide more leverage for climbing hills. FIG. 6a shows pedal crank 14a retracted for normal use where a pin formed on the end of the inner portion of pedal crank 14a engages an opening in the end of crank axle 17. FIG. 6b shows pedal crank 14a extended floor hill-climbing use where the inner portion of pedal crank 14a is disengaged from crank axle 17, which is now driven by ratchet 50 shown in FIG. 6c. Locking means 49 locates pedal crank 14a in either retracted position or extended position. Regulating means 19, in combination with extended pedal cranks 14a and 14b, confine a ratcheting action to a forward quarter-turn, which is the most effective quadrant of pedaling. FIG. 7 shows the extendable swivel of regulating means 19 connected to extended pedal cranks 14a and 14b and defines a teeter-totter motion of pedals 13a and 13b that is similar to climbing stairs, and is just as easy. The lower portion of regulating means 19 is a limiting device that blocks the teeter-totter motion from traveling too low.

FIG. 1a, FIG. 1b, and FIG. 1c show drive wheel 3, which does not need a rim for caliper brakes to brake against, because tread wheel 1 brakes the tread of drive wheel 3, not a rim. Therefore low mass drive wheel 3 contributes to a low unsprung mass (the mass that reacts directly, up and down, to bumps), resulting in a soft ride Braking is accomplished by shutting off air pressure to power unit device 20 which traps air inside. This trapped cushion of air prevents power unit device 20 from turning, which prevents tread wheel 1 from turning, which prevents drive wheel 3 from turning This air cushion braking is the finest form of braking. It is gentle, it is smooth, it runs cool because there is no harsh, noisy, damaging, friction, as with caliper braking, it is quiet, and it lasts indefinitely.

Other Modes

FIG. 5a, FIG. 5b, and FIG. 5c show a mode that reduces the stress on knees, a suitable mode for long rides, rolling hills, and unconditioned cycle operators. FIG. 5a shows the upper end of spring-loaded rod 43a connected to the pivoting rear end of thigh lever 28a. FIG. 5b shows the lower ends of spring-loaded rods 43a and 43b pivotably connected respectively to the end portions of pivoting U-shaped ratchet levers 44a and 44b which urge in turn respectively crank-axle-mounted ratchet wheels 45a and 45b which rotates crank axle 17. FIG. 5c shows adjusting means 46a and 46b, including spring-loaded pawls, of pivoting U-shaped ratchet levers 44a and 44b, that back off under pre-determined pressure. A cycle operator's thigh action exerts half the pressure on thigh levers 28a and 28b and half the pressure on knees. Adjusting means 46a and 46b maintains this division of pressure, as shown in FIG. 5c, by the part of a pawl in contact, releasing at a pre-determined pressure which allows another part of the pawl to engage contact later. In this manner, thigh levers 28a and 28b cannot exceed half the pressure of the thigh action. This is necessary because at least half the pressure is needed to keep a cycle operator's feet on pedals 13a and 13b.

FIG. 9a shows power unit device 20 integral with tread wheel 1 on adjustable axle 2. Speed ratio mechanism 10, also on adjustable axle 2, drives transmitting means 11, including a ratchet, which drives tread wheel 1, which drives drive wheel 3. When cycle operator chooses to assist this drive, air pressure from reservoir 22 forces the diaphragm of power unit device 20 along adjustable axle 2, which is fixed from rotating, thereby forcing ball 51 along fixed loop channel 52, shown in FIG. 9b. This forces power unit device 20 integral with tread wheel 1 to rotate, thereby assisting driving drive wheel 3.

Operation or Function

FIG. 1 shows the considered best mode where the basic Tread Wheel Frame System is enhanced by an additional frame configuration with no top tube (cross bar), and foot room for easy mounting and dismounting; frame separation capability for fitting in an auto trunk; hidden stand; lean-on device, simple controls (power and shift), adjustable handlebars, gentle brake, and soft ride FIG. 1 shows human-powered drive group including: pedals, crank arms, and drive pulley, rotating on a hub, driving a quiet, grease-free, rust-free belt, driving a pulley cluster shifted by a derailleur, a ratchet in the pulley cluster driving a large tread wheel; driving a drive wheel of a cycle. The pulley cluster, derailleur, power unit device, and tread wheel enjoy a high location, safe from rocks and ground debris. FIG. 1 shows a lightweight energy recapture group includes: a safe ripstop nylon reservoir that will leak when punctured but will not pop, a large tread wheel that will not slip when wet as will a small diameter wheel, a saddle pump, and a thigh lever pump driven by thigh action of a cycle operator, to supply air pressure to the reservoir, a power unit device that uses the recaptured air pressure energy to assist pedaling up hills. This power unit device also pumps air pressure during gentle braking down hills, and stops rotating for firm, cool, braking.

FIG. 1 shows telescoping pedal cranks that extend to provide more leverage, more effectively, for climbing steep hills. The pedal cranks are controlled to only a forward quarter-turn ratcheting action as defined by an extendable swivel, and limited from striking the ground. This forward ratcheting action simulates the same motions as climbing up stairs, and with the same ease.

FIG. 1 also shows a rimless wheel on a minimum mass suspension thereby achieving a minimum unsprung mass. This provides a soft ride. This advanced concept wheel is made possible by tread wheel drive that does not require heavy rims for inefficient braking, and heavy hubs for driving.

Other Modes

FIG. 5a, FIG. 5b, and FIG. 5c show a human-powered driving mechanism that reduces the stress on a cycle operator's knees. This concept is appropriate for long rides, rolling hills, and unconditioned cycle operators. A cycle operator's thigh action operates thigh levers that drive ratchets mounted directly to a crank axle. Pawls of the ratchets back off a notch under pre-determined pressure, so that the stress on the cycle operator's knees remains at about 50%. This percentage is necessary to keep a cycle operator's feet from slipping off the pedals. The effect is remarkable and generates enthusiasm for riding longer distances with more enjoyment.

FIG. 9a and FIG 9b show a mode where a power unit device is integral with a tread wheel, which reduces mass, and takes up less room.

Conclusions

There has always been a need for a lightweight human-powered transportation device to extend the range of walking, and better the speed to save time. Now environment protection emphasizes the need for non-polluting transportation. A comfortable, simple to operate, easy to mount and dismount, transportation device extends the spectrum of users to casual, weekend athletes. There is a need for lightweight energy recovery, and energy storage until useful. So much of an operator's energy is wasted, and effort stressed unnecessarily. By insight, hard work, and good fortune, this novel invention has been inspired to satisfy all these needs to an extent never before thought possible. Concentrated urban areas will benefit the most, as people who would normally drive their cars discover the incomparable exhilaration of rushing along silently under their own power Of course claims define scope, and elements of this disclosure include all the undisclosed parts necessary for their function. All possible combinations apply Reference List 1 tread wheel 2 adjustable axle 3 drive wheel 4a and 4b controlling means 5a and 5b rear frame members 6a and 6b lower frame members 7 drive wheel axle 8 saddle tube (inverted Y shape) 9a and 9b substantially vertical frame members 10 speed ratio mechanism (pulley cluster) 11 transmitting means (a pulley cluster ratchet driving a tread wheel) 12 shifting means (derailleur) 13a and 13b pedals 14a and 14b pedal cranks 15 drive pulley 16 hub assembly 17 crank axle 18 power transmission means (drive belt) 19 regulating means (extendable swivel connects to extended cranks to restrict pedals to a teeter-totter motion, and a limiting device) 20 power unit device(to brake, drive, or pump air) 21 power unit device controlling means (controlling fitting) 22 reservoir (to store air pressure) 23 air tube bracket (supports reservoir and conducts air pressure) 24 air pressure gauge 25 stem valve (tire stem valve) 26 pump saddle (with no saddle horn) 27 thigh lever pump 28a and 28b thigh levers (operated by cycle operator's thigh action) 29 shift lever device(for derailleur) 30 frame fitting (releasably holding substantially vertical support container) 31 substantially vertical support container (contains retractable stand and supports adjustable lean-on device) 32a and 32b retaining pins (to hold together the two halves of a cycle) 33 retractable stand (to extend, and support a cycle upright) 34 lean-on device (adjustable, and detachable from support container, to support cycle operator) 35 sloping frame member 36 adjustable single steering fitting 37a and 37b spring-loaded adjustable axle levers 38 spline axle 39 friction wheel brake 40 power lever device (connected to upper portion of said sloping frame member, to operate a power unit device, to control said tread wheel) 41 steering tube 42 steering forks 43a and 43b spring-loaded rods 44a and 44b pivoting U-shaped ratchet levers 45a and 45b crank-axle-mounted ratchet wheels 46a and 46b adjusting means (pawls to back off under pre-determined pressure) 47 steering forks 48 spring-loaded spline shaft 49 locking means 50 ratchet 51 ball 52 loop channel.

NOVELTY

This is a list of some of the more outstanding creative elements of Tread Wheel Frame System structure:

Tread Wheel 1; Rimless Drive Wheel 3 (low mass); Substantially Vertical Frame Members 9a and 9b (double); Saddle Tube 8 (inverted Y shape); Power Unit Device 20 (air brake, air drive, energy recapture); Reservoir 22 (ultralight non-exploding ripstop nylon bag); Pump Saddle 26 (with air bag pump and no saddle horn); Thigh Levers 28*a* and 28*b* (thigh operated); Thigh Lever Pump 27; Pedal Cranks 14*a* and 14*b* (telescoping, with quick change); Crank Axle 17 (simple quick-change pin drive and ratchet drive); Frame Fitting 30 (permits easy disassembly for fitting in automobile trunk); Substantially Vertical Support Container 31 (contains retractable stand, and provides ample foot room for easy mount and dismount); Spring-loaded Adjustable Axle Levers 37*a* and 37*b* (lightest possible suspension).

OBVIOUSNESS/USE

Cycles have been transportation of choice for a century. More brilliant minds and inventive creativity have been focused on cycles than most other categories of inventing, yet no one else has devised any of the above creative elements, especially with the particular uses peculiar to this disclosure. Cycles of choice today look almost the same as the double-triangle cycle structure of 50 years ago. The world is waiting for this breakthrough that no one else thought of.

USE

Use is just as important as structure in deciding obviousness. A cave man picked up a stick and used it for a club. Another cave man picked it up and used it for a spear. Same stick, same result, different use. Similarly, for example, "frame members" of prior art may have similar structure, similar result, but by a different use, which denies obviousness. Different uses usually cause divergent development Clubs developed with a thick end. Spears developed the opposite way and developed with a thin pointed end. This invention will inspire a new direction of development to lighter, safer, friendlier cycles that combine undreamed-of efficiency with fun.

I claim:

1. A tread wheel frame system for a human-powered cycle comprising:

an adjustable axle; a tread wheel rotatably mounted on said adjustable axle; controlling means, including fittings connected to the ends of said adjustable axle, to control said tread wheel; rear frame members having upper portions connected respectively to said controlling means; substantially vertical frame members having upper portions connected respectively to upper ends of said rear frame members; a saddle tube connected to the upper ends of said substantially vertical frame members; lower frame members having the rear portions connected respectively to the lower ends of said rear frame members, and having the middle portions connected respectively to the lower ends of said substantially vertical frame members; a drive wheel disposed substantially below, and being controlled by, said tread wheel; a drive wheel axle connected to the rear portions of said lower frame members; a hub assembly connected to the middle portions of said lower frame members; driving means including pedals, crank arms, crank axle, and drive pulley rotatably connected to said hub assembly, to utilize the power of a pedaling motion; power transmission means, including a drive belt connected to said drive pulley, to convey power; a speed ratio mechanism, including a pulley cluster, rotatably mounted on said adjustable axle, driven by said power transmission means; shifting means, including a derailleur mounted on the middle portion of said rear frame member, to operate said speed ratio mechanism; transmitting means, including a ratchet integral with said speed ratio mechanism, to convey power to said tread wheel; a power unit device connected to the middle portion of said saddle tube, in combination with said tread wheel for driving, including braking, said drive wheel; whereby power transmitted to said drive wheel controls the motion of said cycle.

2. The frame system according to claim 1 further including:

a frame fitting connected to the forward ends of said lower frame members; a substantially vertical support container releasably held in said frame fitting; connecting means including retaining pins for connecting said frame fitting to said substantially vertical support container; a sloping frame member having the lower end connected to the upper portion of said substantially vertical support container; a steering tube connected to the upper end of said sloping frame member; an adjustable single steering fitting rotatably connected to said steering tube, a power lever device, mounted on the upper portion of said sloping frame member, for operating said power unit device; a shift lever device, mounted on the upper portion of said sloping frame member, for operating said shifting means, including a derailleur, whereby adequate foot room provides low-level mounting and dismounting.

3. The frame system according to claim 2 further including:

a reservoir; an air tube bracket connected to the middle portion of said saddle tube, said air tube bracket connected to said reservoir; a stem valve connected to said air tube bracket; a gauge connected to said air tube bracket, whereby air pressure is stored, introduced, and monitored.

4. The frame system according to claim 3 further including:

a power unit device controlling means, including a controlling fitting, for controlling said power unit device drive of said tread wheel; said power unit device controlling means connected to said power unit device and mounted to the middle portion of said saddle tube, whereby air pressure from said reservoir drives said power unit device to assist driving said cycle; whereby during gentle braking said power unit device pumps air pressure into said reservoir, thereby recapturing energy; whereby air pressure is shut off from said power unit device for firm braking.

5. The frame system according to claim 4 further including:

a pump saddle adjustably mounted to the upper end of said saddle tube; a thigh lever pump connected to the upper portion of said saddle tube; thigh levers operated by the thigh action of a cycle operator; connecting means including a spring-loaded spline shaft for engaging said thigh levers with said thigh lever pump, whereby a cycle operator generates air pressure.

6. The frame system according to claim 2 further including:

a retractable stand storable inside said support container; an adjustable lean-on device detachably connected to the upper end of said support container; a friction wheel brake mounted through said steering tube, whereby comfort and safety are provided.

7. The frame system according to claim 1 further including:

steering forks rotatably mounted to said steering tube and controlled by said adjustable single steering fitting; spring-loaded adjustable axle levers pivotably mounted respectively to distal ends of said steering forks; a spline axle connected to said spring-loaded adjustable axle levers, whereby said spring-loaded adjustable axle levers are locked in travel unison by said spline axle, providing a stable, cushioned ride.

8. The frame system according to claim 1 further including:

said crank arms having telescoping portions: inner portion having pins formed on the proximal ends that respectively engage ends of said crank axle, and having said pedals connected respectively to the distal ends; outer portions, rotatably mounted respectively to ends of said crank axle, having urging means including ratchets to drive said crank axle; locking means including spring-loaded pins to locate said crank arms in an extended ratcheting action or contracted engaged action; controlling means, including said extendable swivel with a limiting device, to define the extended ratcheting action, whereby a cycle operator will select engaged action or ratcheting action.

9. The frame system according to claim 1 wherein said drive wheel is a rimless wheel, whereby mass is reduced and a softer ride is produced.

10. The frame system according to claim 1 further including:

a saddle adjustably mounted to the upper end of said saddle tube; thigh levers pivotably connected to said saddle; spring-loaded rods having upper ends connected respectively to the rear ends of said thigh levers; pivoting U-shaped ratchet levers pivotably connected respectively to the lower ends of said spring-loaded rods; crank-axle-mounted ratchet wheels urged to rotate respectively by said pivoting U-shaped ratchet levers, adjusting means, including spring-loaded pawls of said pivoting U-shaped ratchet levers, for backing off under predetermined pressure, whereby knee stress is reduced.

11. The frame system according to claim 1 wherein said power unit device is integral with said tread wheel, wherein mass is reduced.

* * * * *